United States Patent Office 3,525,553
Patented Aug. 25, 1970

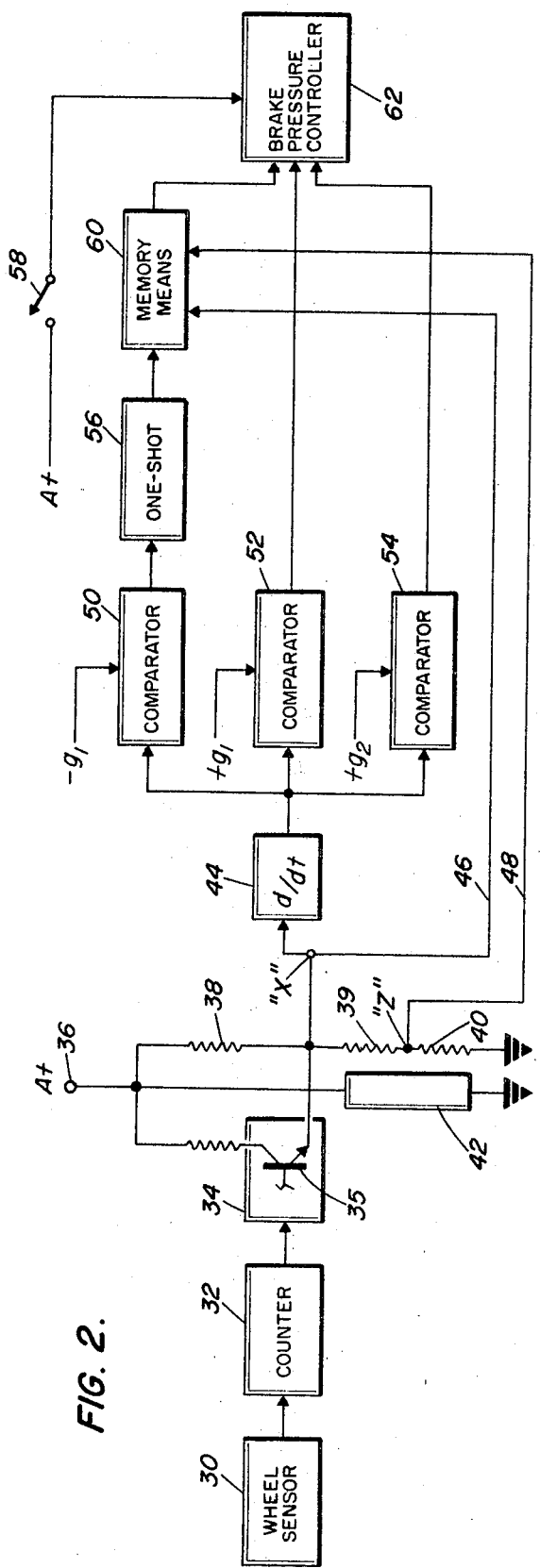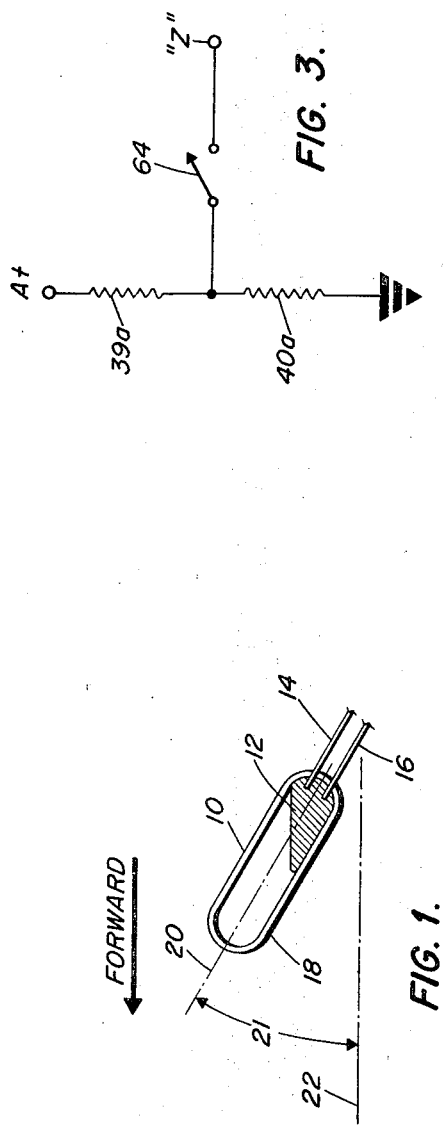

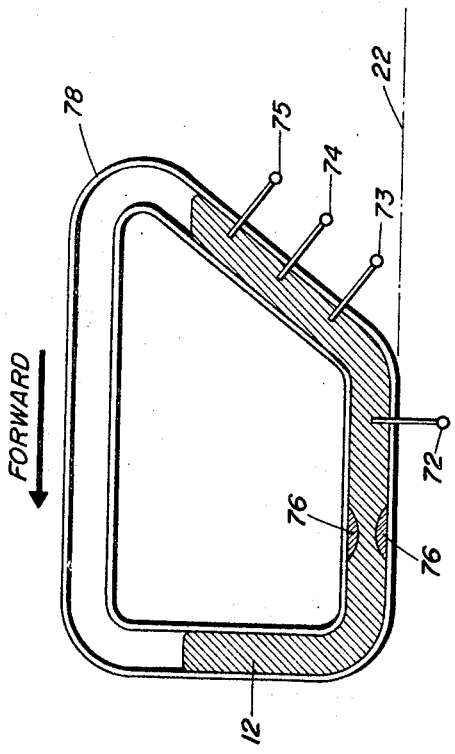
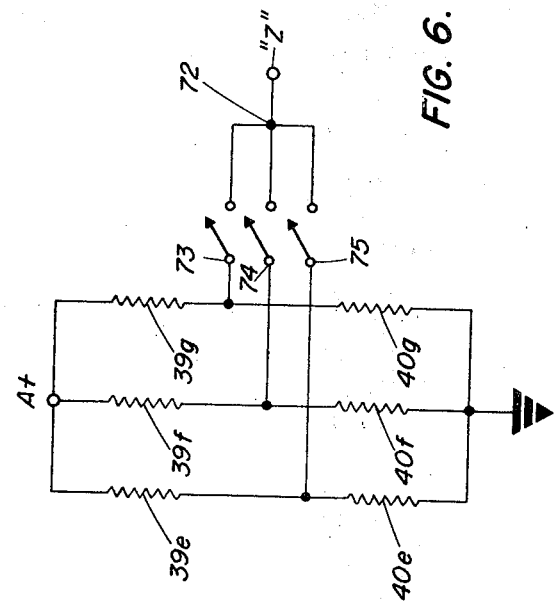
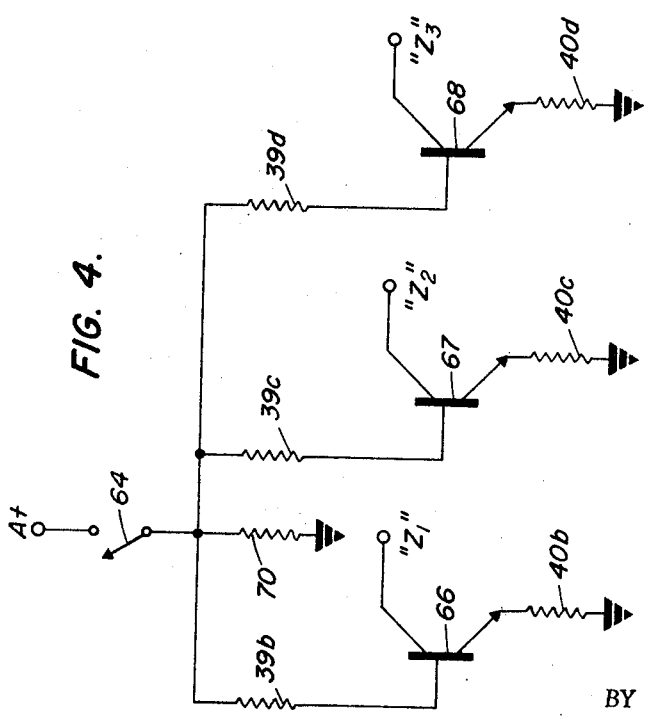

3,525,553
ADAPTIVE BRAKING SYSTEM RESPONSIVE TO TIRE-ROAD SURFACE CONDITIONS
Ralph W. Carp, Baltimore, Md., and Donald W. Howard, South Bend, Ind., assignors to The Bendix Corporation, a corporation of Delaware
Filed Sept. 30, 1968, Ser. No. 763,702
Int. Cl. B60t 8/12
U.S. Cl. 303—21
14 Claims

ABSTRACT OF THE DISCLOSURE

An adaptive braking system for automotive vehicles and the like having hydraulic brakes wherein the rotational speed of a wheel to be controlled during braking is electrically sensed and a D.C. voltage level proportioned to wheel acceleration is derived therefrom. Wheel acceleration is compared to various reference levels corresponding to values of wheel acceleration so as to generate error signals which are applied to a hydraulic fluid pressure modulator which controls hydraulic fluid pressure in the brake wheel cylinders. Inertia sensors located in the vehicle sense vehicle deceleration and vary the adaptive braking system control cycle in accordance therewith.

CROSS REFERENCES TO RELATED APPLICATIONS

The means for varying the control cycle of an adaptive braking system in response to both wheel and vehicle deceleration as disclosed herein is particularly adapted to implementation in adaptive braking control systems, though not limited thereto, as disclosed in patent application Ser. No. 712,672 for "Automotive Anti-Skid Control System" by Slavin et al., filed Mar. 13, 1968, and which is owned by the assignee of this application.

BACKGROUND OF THE INVENTION

This invention relates to braking system for automobiles and the like and more particularly to an adaptive braking system which can adapt its brake control cycle in response to the state of the tire-road interface to provide optimum braking characteristics regardless of the tire-road interface condition.

Mu-slip curves, which are plots of the vehicle tire-road interface frictional force versus wheel slip, are well known in the art. These curves, which are empirically obtained for various road and tire conditions, show that mu becomes a maximum in the range of 15 to 25% slip. Height and sharpness of this maximum point is generally dependent upon the nature of the tire-road interface and its condition. In particular, published mu-slip curves show that for a typical wet road surface the curve peak is depressed but sharply defined while for a dry road surface the peak is higher but not sharply defined. In other words, for the wet road condition, less frictional force can be developed at the tire-road interface and after the peak of the mu-slip curve is exceeded wheel slip will rapidly increase. For the dry road condition, larger frictional forces can be developed at the tire-road interface hence wheel slip tends to increase much slower than if the road surface were wet. Thus, a braked wheel is more apt to lock, with a given brake pressure, on a wet pavement than on a dry pavement with resultant lower vehicle deceleration. An adaptive anti-lock braking system which is responsive to wheel deceleration and acceleration but insensitive to vehicle deceleration cannot fully adapt itself to various conditions of tire-road interface so that the desired goal of optimum stopping distances and vehicle control cannot be fully realized.

In the aforementioned patent application there was described an adaptive braking system for automobiles, trucks and the like which is comprised basically of an electronic control channel for each wheel or group of wheels to be controlled. Briefly, a control channel includes a wheel sensor which generates a D.C. voltage level proportional to wheeel rotational speeed, a derivative amplifier which generates a D.C. voltage level proportional to wheel acceleration and a number of comparators which compare actual wheel acceleration and a number of comparators which compare actual wheel acceleration (or deceleration) with fixed reference levels corresponding to predetermined values of wheel acceleration and deceleration to generate error signals. The error signals are applied to a hydraulic brake fluid pressure modulator which in response thereto varies the brake fluid pressure in the wheel cylinders to maintain wheel slip at a point which tends to maximize the frictional force developed at the tire-road interface. The aforementioned system is partially activated when the vehicle operator depresses his brake pedal and resultant wheel deceleration reaches a first of the said reference levels ($-g_1$) which corresponds to a fixed amount of wheel deceleration. At this time a percentage of the instantaneous wheel rotational speed is memorized for a predetermined time period. If during the predetermined time period wheel speed drops to or below the memorized speed the system is fully activated and the brake fluid pressure at the wheel cylinder is automatically varied as the vehicle is brought to a controlled stop.

It should be obvious from the foregoing discussion that on a wet surface after the brake pedal has been depressed and the wheel has decelerated past the $-g_1$ reference level wheel deceleration will be very high with wheel speed dropping rapidly while on a dry surface under otherwise identical conditions wheel deceleration will be lower. In other words, if after the wheel has decelerated past the $-g_1$ reference level the percentage drop in wheel rotational speed during the memorization period required to trigger the anti-lock system into operation so as to release braking pressure is the same whatever the tire-road interface conditions. If the percentage speed drop required is set high, for example, in the order of 10% drop during a 200 microsecond time period, then it can be assured for dry road conditions that the vehicle operating point on the mu-slip curve will have passed over the curve peak but since the mu-slip curve for this type of road condition is flat and close to the peak value for slip magnitudes in excess of critical slip (slip magnitude where mu is a maximum) it can be assured that braking will be optimized. However, this percentage speed drop, if the road surface is wet so that the mu-slip curve peak is lower and sharper, will cause wheel speed to rapidly decrease and possibly will cause the wheel to lock before the anti-lock system can react to release the braking force. This becomes even more apparent when it is realized that the system has a certain time constant characteristic delay between the time the system is triggered and the time the system actually releases the braking force.

To compensate for this characteristic behavior of the wheel during the memorization period, which behavior depends upon the state of the tire-road interface, it is merely necessary to change in response to some readily determinable measurement of the tire-road interface condition the percentage of instantaneous speed which is memorized and to which wheel speed must drop during the memorization period before the system is fully activated. As has also been previously described, one measure of the tire-road interface condition is the deceleration of the vehicle with respect to deceleration of the wheel.

It is thus one object of this invention to provide a means for sensing vehicle deceleration. Accordingly, an inertial sensor has been devised which when properly located in a vehicle will generate electrical signals proportional to the deceleration of the vehicle. These electrical signals proportional to vehicle deceleration may either be of the threshold type so that the signal is generated after vehicle deceleration passes a predetermined threshold; step type so that the signals change step-wise as vehicle deceleration.

Various types of inertial sensors might be advantageously employed. One type is a simple switch which operates on a conductive fluid principle. This switch need be merely a closed non-conductive tube in which is contained a small quantity of a conductive fluid such as mercury and having a number of electrical contacts penetrating through the tube into the conductive fluid so as to establish an electrical circuit through the contacts and conductive fluid when the tube is oriented in a certain manner. When the tube is tilted the conductive fluid separates from one or both of the contacts to break the electrical circuit. This tube is arranged on the vehicle fore and aft axis in such a manner that, as the vehicle decelerates, the conductive fluid is inertially displaced from its normal position so as to make or break the electrical circuit.

It is another object of this invention to provide a means responsive to the condition of the tire-road interface for varying the control cycle of anti-skid systems already known so as to produce an optimized adaptive anti-lock system. In the anti-skid system described in the aforementioned patent application Ser. No. 712,672 there was taught a means for generating a D.C. voltage proportional to wheel rotational speed. A predetermined percentage of this voltage, that is, a voltage proportional to a predetermined percentage of wheel speed, is memorized when the wheel decelerates to the $-g_1$ reference level, as previously explained. This D.C. voltage is developed across a voltage divider with the memorized voltage, which is proportional to a percentage of wheel speed, being picked off the voltage divider. In the present teachings, the percentage of wheel speed memorized is varied by changing the voltage divider ratio in response to the making and breaking of the electrical circuit through the inertial sensor.

Still another object of this invention is to provide an adaptive braking system having a brake control cycle which is responsive to both vehicle and wheel accelerations.

One further object of this invention is to provide an adaptive braking system of the type described which is compatible with existing hydraulic braking systems for automobiles and the like.

Other advantageous objects of this invention will become apparent through a reading and an understanding of the following description of the preferred embodiment of the invention.

BRIEF DESCRIPTION OF THE DRAWINGS

FIG. 1 is a representation of an inertial switch having a threshold type operating point which works on a conductive fluid principle, which switch is useful for sensing vehicle deceleration.

FIG. 2 is a combination block and schematic diagram of an adaptive braking system designed in accordance with the teachings of this invention.

FIG. 3 is a schematic showing more particularly how the inertial switch is connected into the schematic of FIG. 2.

FIG. 4 is a schematic showing in greater detail how the inertial switch can control a plurality of adaptive braking control channels.

FIG. 5 is a representation of an inertial switch having multiple operating points.

FIG. 6 is a schematic showing how an inertial switch having multiple operating points can vary the control cycle of an adaptive braking system channel.

DESCRIPTION OF THE PREFERRED EMBODIMENT

Referring to FIG. 1, a threshold inerial sensor 10 suitable for detecting a threshold value of vehicle deceleration is comprised of an insulating tubular envelope 18, suitably glass, and a conductive fluid 12, suitably mercury, electrically bridging immersed electrical contacts 14 and 16. The sensor is mounted in a vehicle so that the sensor's active axis 20, that is the axis along which the sensor's inertial mass, in this case the conductive fluid 12, is constrained, is aligned with the vehicel fore and aft axis and inclined at an angle 21 with respect to line 22 which joins the points of contact of the vehicle wheels with the road surface. During normal vehicle operation, that is, when the vehicle is moving forward in the direction of the arrow and not decelerating, the conductive fluid remains as shown and the circuit through contacts 14 and 16 are established. When the vehicle decelerates, however, conductive fluid 12 tends to move upward of the tube 18. At a predetermined rate of deceleration which, for a given sensor of the instant type, is dependent upon angle 21, conductive fluid 12 moves sufficiently upward of the tube to break the electrical bridge between contacts 14 and 16 thus opening the electrical circuit.

Referring to FIG. 2 there is seen a combination block and schematic diagram of an anti-skid control channel previously described in patent application Ser. No. 712,-672 but with the addition of means for varying the control cycle in response to vehicle deceleration. A wheel speed sensor 30 mounted on and sensing the rotational speed of a wheel whose braking characteristics are to be controlled, generates pulses linearly related to wheel speed. The pulses are converted to a D.C. voltage level, in counter 32, which is proportional to wheel rotational speed. This D.C. voltage is supplied to a threshold 34 which generates no output as long as wheel speed remains below a threshold value. The output element of the threshold is an emitter follower 35 which reproduces upon its emitter any D.C. voltage applied to the input of the threshold which is above the threshold value. The threshold output is applied to terminal X upon which is also established a minimum signal by the voltage divider comprised of resistors 38, 39 and 40. The wheel speed voltage signal is applied to differential amplifier 44 which generates in response thereto a D.C. voltage level proportional to wheel acceleration and deceleration. The wheel acceleration signal is applied to the comparators 50, 52, and 54 wherein it is compared to a $-g_1$ reference level, which is a D.C. voltage level proportional to a predetermined magnitude of wheel deceleration, and to $+g_1$ and $+g_2$ reference levels which are D.C. voltage levels proportional to predetermined magnitudes of wheel acceleration. During a braked stop of the vehicle, when the operator depresses the foot pedal, brake switch is closed applying A+ voltage to the brake pressure controller 62 which, in a manner to be described, will automatically control the brake fluid pressure to the wheel so as to optimize the vehicle braking characteristics. Assume now that the vehicle is braked and the wheel decelerates to the $-g_1$ reference level. Comparator 50 generates an error signal triggering one shot 56 to produce a single output pulse of a fixed predetermined time period. Memory means 60 is triggered thereby to store therein, across a memory capacitor, the voltage then appearing across resistor 39. This is a voltage proportional to a predetermined percentage of instantaneous wheel speed. During the present discussion it is being assumed that the box 42, which contains the inertial switch and circuitry for varying the relationship between the voltages appearing at terminal X and terminal Z, is ineffectual, that is, that the vehicle is decelerating at such a rate that the elements contained in box 42, which elements will be described fully below, do not vary the voltage relationships set up by the divider comprised of resistors 38, 39 and 40.

Returning now to the description of the operation of the control system as shown in FIG. 2, the voltage impressed across memory means 60 is a voltage proportional to a predetermined percentage of the instantaneous wheel speed at the time the wheel decelerated to the $-g_1$ reference level. If, during the time period defined by the period of the one shot output pulse wheel speed should drop to the memorized wheel speed memory means 60 generates an output which activates brake pressure controller 62 to release the brake pressure on this wheel. The wheel is now free to accelerate and will eventually accelerate to the $+g_1$ reference level at which time comparator 52 will generate an output error signal which when applied to brake pressure controller 62 will cause the brake pressure at the wheel to once again be slowly increased. If the wheel continues to accelerate to the $+g_2$ reference level, which is higher than the $+g_1$ reference level, comparator 54 generates an error signal which when applied to brake pressure controller 62 causes brake pressure to be more rapidly increased thus in a more positive manner causing the wheel to be braked. As the wheel now begins to slow down the basic control cycle is reversed with the fast brake pressure buildup being discontinued when wheel acceleration drops below the $+g_2$ level. The slow rate brake pressure buildup continues, however, until the wheel slows down and decelerates to the $-g_1$ reference level at which time the cycle is repeated.

Assume now, and referring to FIG. 3, that the circuitry shown in FIG. 3 is contained in box 42 and connected to terminal Z, A+ voltage and ground as shown. Normally closed switch 64 is an inertial sensor such as previously described. If, during the braking cycle at the time memory means 60 as shown in FIG. 2 is energized vehicle deceleration is high enough to cause inertial switch 64 to open, such as would be the case during a stop on dry pavement, the voltage at terminal Z as determined by the voltage divider comprised of resistors 39 and 40 is unaltered over the situation previously described. If, however, the stop is on a wet pavement so that inertial sensor 64 does not open resistor 40a shunts resistor 40 thus causing the voltage on terminal Z to move closer to ground; that is, the voltage across resistor 39 of FIG. 2 increases. If switch 64 is opened at the time one-shot 56 is triggered this higher voltage is impressed in memory means 60 so that during the time period defined by the one shot output pulse wheel speed voltage need drop only to this higher voltage to trigger brake pressure control of 62. This, of course corresponds to a smaller wheel speed change reguided to trigger brake pressure control 62.

The aforementioned patent application Ser. No. 712,672 describes an adaptive braking system having three control channels essentially identical to the control channels shown in FIG. 2 with the exception that no means for varying the control cycle in response to vehicle deceleration was shown. One control channel is used to sense and control the right front wheel, another control channel senses and controls the left front wheel, while the third control channel senses and controls the rear axle. Each of these control channels operates independently with the control comparators generating the characteristic error signals when the wheel controlled and sensed by that channel passes through the various reference levels as described. With this in mind it should now be obvious that a single inertial sensor can be used to control a plurality of control channels since each individual control channel need only know the vehicle deceleration at the time one-shot 56 of that particular control channel is triggered. FIG. 4 shows a circuit using a single inertial sensor for varying the control cycle on three separate control channels in response to vehicle deceleration, and reference should now be made to this figure. As before the circuitry of FIG. 4 is contained in box 42 of FIG. 2 with terminal $Z_1$ of FIG. 4 being connected to terminal Z of the first control channel, terminal $Z_2$ being connected to terminal Z of the second control channel and terminal $Z_3$ being connected to terminal Z of the third control channel. Switch 64 is normally closed so that if during deceleration switch 64 remains closed, such as would be the case should the stop be taking place on a wet pavement, transistors 66, 67 and 68 are saturated and resistors 40b, 40c and 40d shunt the resistor 40 of their respctive control channel. With switch 64 thus closed at the time one-shot 56 on a particular control channel is triggered a decreased voltage is impressed across memory means 60 so that the channel will operate to decrease the brake pressure when wheel speed has dropped by a lesser amount than if switch 64 is opened as would be the case should the stop be taking place on a dry pavement.

It has been noticed at times that the contacts of switch 64 may become contaminated due to impurities in the conductive liquid. These contacts can be kept clean by increasing the voltage which switch 64 is required to switch. This is accomplished by the addition of resistor 70 without varying any other characteristics of the circuit.

It is also advantageous in certain adaptive braking systems to provide a stepwise adaptation of the control cycle in response to vehicle deceleration, that is, to vary the memorized speed at a number of vehicle deceleration levels. FIG. 5 shows an inertial sensor which can provide electrical signals at various levels of vehicle deceleration and reference should now be made thereto. A conductive fluid 12 is contained in non-conductive tube 78 so as to normally immerse common contact 72 and individual contacts 73 to 75 therein. The sensor is installed in a vehicle oriented as shown along the vehicle fore and aft axis with line 22 comprising the line connecting the wheel contact points at the road surface. During a stop, while the vehicle is decelerating, inertia forces the conductive fluid in a forward direction allowing contacts 75, 74 and 73 to emerge from the conductive fluid in response to deceleration forces. Restrictions 76—76 might suitably be attached to the inside surface of tube 78 to dampen the flow of conductive fluid 12.

Referring now to FIG. 6 there is seen the means for integrating the inertial sensor of FIG. 5 into the basic control channel circuitry of FIG. 2, the circuitry of FIG. 6 comprising for the purposes of the present description the contents of box 42. Common terminal 72 of the inertial sensor is connected to terminal Z of FIG. 2. During a braked stop, for example, on wet pavement the vehicle deceleration is very low and switch terminals 73 to 75 remain connected to terminal 72 so that resistor 40 of FIG. 2 is shunted by the resistors 40e, 40f and 40g. The voltage at terminal Z is thus depressed to its lowest value for this particular configuration and the wheel speed drop during the one-shot output pulse period required to trigger brake pressure controller 62 is quite small. It should now be obvious that if higher frictional forces can be developed at the tire-road interface terminals 75, 74 and 73 will become disconnected from terminal 72 in the order named, dependent upon vehicle deceleration. For example, a predetermined intermediate level of vehicle deceleration terminal 75 becauses disconnected from terminal 72 and resistor 40 of FIG. 2 is thus shunted only by resistors 40f and 40g, the voltage on terminal Z thus rising. If at this time the wheel attains the $-g_1$ reference level the voltage memorized in memory means 60 will be such as to require the wheel speed to drop through a wider range than if terminal 74 remains connected to 72 in order to trigger brake pressure controller 62. Of course, at a next higher vehicle deceleration level both terminals 74 and 75 become disconnected from 72 so that resistor 40 of FIG. 2 is now shunted only by resistor 40g with a still further incremental rise in the voltage at terminal Z. It can thus be seen that step-wise variation of the control channel control cycle in response to vehicle deceleration has been achieved.

Returning now to FIGS. 2 and 3 it can be seen that at zero wheel speed there is a certain quiescent current flowing through resistor 40. It is necessary to prevent distortion of the control cycle, which might be caused by the addition of the inertial sensor 64 and its associated circuitry, that the quiescent current through resistor 40a be equal to the quiescent current through resistor 40. This can be accomplished simply by the correct sizing of resistors 39a and 40a. In like manner, resistors 39b, 39c and 39d of FIG. 4 are chosen with consideration for the base emitter drop of transistors 66, 67 and 68 and the values of resistors 40b, 40c and 40d so as to set the quiescent current through these last mentioned resistors to equal the quiescent current through their corresponding shunted resistors. Thus in like manner the resistors of the circuit shown in FIG. 6 are chosen.

Having described in our preferred embodiment of the invention various means for effecting a change of the control cycle of adaptive braking control channels in response to vehicle deceleration it should be apparent that other alterations and modifications of our invention might become obvious to one skilled in the art. Therefore, not wishing to limit our invention to the specific forms shown we accordingly claim as our invention the subject matter including modifications and alterations thereof encompassed by the true spirit and scope of the appended claims.

The invention claimed is:

1. In a wheeled vehicle having a wheel braking system whereby said vehicle wheels are braked by a braking force, to decelerate said vehicle at least one adaptive braking control channel each said control channel including means for generating a first electrical signal proportional to the rotational speed of one of said wheels, means for generating a second electrical signal proportional to acceleration and deceleration of said one wheel, means for generating a third electrical signal proportional to a predetermined deceleration reference level, means for comparing said second and third electrical signals to generate a memorization pulse having a predetermined time period, memory means enabled by said memorization pulse for storing a percentage of the instantaneous value of said first electrical signal, means comparing said stored signal with said first electrical signal during said time period for generating an error signal when said first electrical signal attains a predetermined relationship with said stored signal during said time period and means responsive to said error signal for attenuating the braking force of said one wheel, an improvement in said control channel comprising:
    means responsive to said vehicle deceleration for generating a fourth electrical signal; and
    scaling means responsive to said first electrical signal for scaling said first electrical signal to a percentage thereof, said percentage of said first electrical signal being memorized by said memory means when enabled, said scaling means being additionally responsive to said fourth electrical signal for determining the percentage of said first electrical signal to be memorized by said memory means.

2. An improved adaptive braking control channel as recited in claim 1 wherein said means for generating a fourth electrical signal comprises an inertial switch mounted with its active axis generally aligned with said vehicle fore and aft axis so as to be responsive to vehicle deceleration forces along said vehicle fore and aft axis for effecting activation of said switch at a predetermined magnitude of vehicle deceleration, said switch activation comprising said fourth electrical signal.

3. An improved adaptive braking control channel as recited in claim 2 wherein said first electrical signal comprises a voltage level proportional to wheel rotational speed and said scaling means comprises a voltage divider across which said first electrical signal is impressed, said memorized signal being tapped from across one predetermined section of said voltage divider, said intertial switch being connected to effectively remove another predetermined section from said voltage divider.

4. An improved adaptive braking control channel as recited in claim 3 wherein said first electrical signal comprises a D.C. voltage whose magnitude is proportional to wheel rotational speed.

5. An improved adaptive braking control channel as recited in claim 2 with additionally a D.C. primary voltage source and wherein said first electrical signal comprises a D.C. voltage whose magnitude is proportional to wheel rotational speed, said scaling means comprising:
    a resistive voltage divider network connected across said primary voltage source, said first electrical signal being connected across a first section of said voltage divider, said first section comprising second and third serially connected sections, said memorized voltage being tapped from across said second section and said inertial switch being connected to vary the resistive value of said third section.

6. An improved adaptive braking control channel as recited in claim 2 with additionally a D.C. primary voltage source having first and second terminals and wherein said first electrical signal comprises a D.C. voltage whose magnitude is proportional to wheel rotational speed, said scaling means comprising:
    a first resistive voltage dividing network having first and second intermediate terminals said network being connected across said primary voltage source, said first electrical signal being connected between said first intermediate terminal and said first terminal and said memorized voltage being tapped from said first and second intermediate terminals;
    a second resistive voltage dividing network connected across said primary voltage source and having a third intermediate terminal, said inertial switch electrically connecting said third intermediate terminal with said second intermediate terminal when closed.

7. An improved adaptive braking control channel as recited in claim 6 wherein when said inertial switch is open the product of the resistance between said first terminal and said third intermediate terminal with the resistance between said second terminal and said second intermediate terminal is equal to the product of the resistance between said first terminal and said second intermediate terminal with the resistance between said second terminal and said third intermediate terminal.

8. At least one improved adaptive braking control channel as recited in claim 1 wherein said means for generating a fourth electrical signal comprises:
    an inertial switch mounted with its active axis generally aligned with said vehicle fore and aft axis so as to be responsive to vehicle deceleration forces along said vehicle fore and aft axis;
    one transistor in each said control channel whose conductive state comprises said fourth electrical signal in said control channel; and
    means for forward biasing all said transistors simultaneously, said forward biasing means being connected to said transistors by said inertial switch.

9. At least one improved adaptive braking control channel as recited in claim 8 wherein said transistors each include emitter, collector and base terminals, the conductive state of said emitter-collector circuit comprising said fourth electrical signal and wherein said forward biasing means comprises a D.C. power source connected through said inertial switch to each said base terminal.

10. At least one improved adaptive braking control channel as recited in claim 9 wherein said D.C. power source includes first and second terminals and said first electrical signal comprises a D.C. voltage level proportional to wheel rotational speed and said scaling means comprises:
    a first resistive voltage divider having first and second intermediate terminals, said first divider being connected across said D.C. power source, said first electrical signal being connected across said first intermediate terminal and said D.C. power source first terminal and said memorized voltage being tapped across said first and second intermediate terminals; and
    a second resistive voltage divider including first and second resistors, said first resistor being connected serially with said inertial switch between said D.C. power source second terminal and said base terminal and said second resistor being connected between said D.C. power source first terminal and said emitter terminal, said collector terminal being connected to said second intermediate terminal.

11. At least one improved adaptive braking control channel as recited in claim 10 wherein said inertial switch includes first and second contacts, said first contact being connected to said D.C. power source second terminal and said second contact being connected to said second resistors, with additionally, a third resistor connected between said second contact and said D.C. power source first terminal.

12. An improved adaptive braking control channel as recited in claim 1 wherein said means for generating a fourth electrical signal comprises an inertial sensor mounted with its active axis generally aligned with said vehicle fore and aft axis so as to be responsive to vehicle deceleration forces along said vehicle fore and aft axis and comprising an inertial mass having a normally at-rest state and urged from said at-rest state by an amount proportional to said vehicle deceleration force and a plurality of switches activated sequentially by said inertial mass as said inertial mass is urged from said at-rest state and wherein said first electrical signal comprises a voltage level proportional to wheel rotational speed and said scaling means comprises a voltage divider across which said first electrical signal is impressed, said memorized signal being tapped from across one predetermined section of said voltage divider and said plurality of switches being connected to remove other predetermined sections from said voltage divider.

13. An improved adaptive braking control channel as recited in claim 12 with additionally a D.C. power source having first and second terminals and wherein said means for generating a first electrical signal comprises means for generating a first D.C. electrical signal, said voltage divider comprising:

a first divider section connected across said D.C. power source and having first and second intermediate terminals, said first electrical signal being connected across said first intermediate and said first terminals and said memorized signal being tapped from across said first intermediate and said second intermediate terminals; and a plurality of second divider sections, one for each of said plurality of switches, each second divider section being connected across said D.C. power source and having an intermediate terminal connected through its switch to said second intermediate terminal.

14. An improved adaptive braking control channel as recited in claim 13 wherein said inertial sensor comprises:

a conductive fluid comprising said inertial mass;

a non-conductive elongated container for containing said conductive fluid and having first and second ends, sides and an active axis arranged along the fore and aft axis of said vehicle at an ascending slope from said vehicle rear to said vehicle front, said container first end being located toward said vehicle rear, a common switch terminal penetrating said container in the vicinity of said first end; and a plurality of switch second terminals penetrating said container sides, said common terminal taken with each of said second terminals individually comprising said plurality of switches.

References Cited

UNITED STATES PATENTS

| | | | |
|---|---|---|---|
| 3,245,727 | 4/1966 | Anderson et al. | 303—21 |
| 3,362,757 | 1/1968 | Marcheron | 303—21 |

DUANE A. REGER, Primary Examiner

U.S. Cl. X.R.

303—20